United States Patent
Hibiya et al.

[11] Patent Number: 6,130,278
[45] Date of Patent: Oct. 10, 2000

[54] FINE CELL-CONTAINING POLYESTER FILM

[75] Inventors: Takashi Hibiya; Takatoshi Miki, both of Sakata-gun, Japan

[73] Assignee: Mitsubishi Polyester Film Corporation, Tokyo, Japan

[21] Appl. No.: 09/132,034

[22] Filed: Aug. 11, 1998

[30] Foreign Application Priority Data

| Aug. 12, 1997 | [JP] | Japan | 9-217408 |
| Aug. 12, 1997 | [JP] | Japan | 9-217409 |
| Oct. 27, 1997 | [JP] | Japan | 9-294034 |
| Dec. 2, 1997 | [JP] | Japan | 9-331511 |

[51] Int. Cl.⁷ ..................... C08K 5/09
[52] U.S. Cl. ............ 524/322; 524/229; 524/318; 524/385
[58] Field of Search ............ 524/229, 318, 524/322, 385

[56] References Cited

U.S. PATENT DOCUMENTS

| 4,857,396 | 8/1989 | Otonari | 428/315.5 |
| 4,871,784 | 10/1989 | Otonari | 521/138 |
| 5,069,953 | 12/1991 | Kishikawa | 428/201 |
| 5,422,175 | 6/1995 | Ito | 428/304.4 |

*Primary Examiner*—Paul R. Michl
*Attorney, Agent, or Firm*—David G. Conlin; Lisa Swiszcz Hazzard; Dike, Bronstein, Roberts & Cushman, LLP

[57] ABSTRACT

A fine cell-containing polyester film of the present invention comprises 70 to 97% by weight of a polyester and 3 to 30% by weight of a thermoplastic resin immiscible with polyester and produced by stretching at least one direction, the difference in gloss between opposite surfaces of said polyester film being not less than 3%, and a gloss of one surface of said polyester film being not less than 25%. Such a fine cell-containing polyester film is excellent in gloss, printability, transport property and/or flexibility.

26 Claims, No Drawings

FINE CELL-CONTAINING POLYESTER FILM

BACKGROUND OF THE INVENTION

The present invention relates to a fine cell-containing polyester film, and more particularly, to a fine cell-containing polyester film which is excellent in gloss, printability, transport property and/or flexibility; image-receiving papers suitable for a video printer, which are excellent in image-receiving property and transport property, and has a good printability; and release papers suitable for seal print, which are excellent in adhesion to a coating layer applied thereon.

Polyester films have widely used as industrial materials because the films have various well-balanced properties and are excellent in cost performance. Among these polyester films, fine cell-containing polyester films which are produced, as light-weight white opaque films having a cushioning property, by blending polyester with a thermoplastic resin immiscible therewith and molding the resultant blend into a film shape, have been applied, for example, to synthetic papers such as mounts for seal print, base films of magnetic cards or the like. Especially, the fine cell-containing polyester films have been advantageously used as image-receiving papers or mounts (release papers) for products such as seal print or the like, because of an excellent cushioning property thereof.

Recently, the fine cell-containing polyester films have been used as image-receiving papers having the size of post card on which video images are directly printed. In this case, it has been required that opposite surfaces of the image receiving paper have different properties from each other. That is, the front surface of the image-receiving paper on which images are to be printed, is required to have a high gloss (low surface roughness) in order to receive precise print images thereon. On the other hand, the opposite (rear) surface of the image-receiving paper is required to have a low gloss (high surface roughness) in order to impart a high transport property thereto. When the rear surface of the image-receiving paper exhibits a high gloss, there arises a problem that the image-receiving papers are inhibited from being fed each single sheet into a printer (i.e., so-called double transport of the image-receiving papers is caused).

Also, there have been an increasing demand for release papers suitable for seal print. In this case, there arises a problem that the seal print formed integrally from the image-receiving paper and release paper cannot be fed each single sheet to a printer, i.e., the double transport of the seal prints is caused. Further, since the conventional fine cell-containing polyester films are deteriorated in adhesion to a silicon coat, it has been demanded to improve an adhesion property.

The fine cell-containing polyester films have been produced by melt-kneading polyester and a thermoplastic resin immiscible therewith in an extruder, extruding the resultant melted material through an extrusion die on a casting roll to cool and form an amorphous sheet, followed by successively subjecting the obtained sheet to longitudinal stretching treatment, transverse stretching treatment and heat treatment.

In such a process for the production of the fine cell-containing polyester films, the melted material composed of polyester and the immiscible thermoplastic resin is extruded on the casting roll and contacted with a surface thereof. For this reason, a surface of the resultant sheet where the sheet is contacted with the casting roll (cast surface) theoretically exhibits a lower surface roughness than that of the opposite surface of the sheet (air-side surface). As a result, the cast surface of the resultant oriented film shows a larger gloss than that of the air-side surface thereof. Accordingly, in order to eliminate the double transport, it is suitable that the cast surface and air-side surface of the film are used as a printing surface and a back feed surface, respectively.

However, in such a case, since the immiscible thermoplastic resin has a larger affinity to a surface material of the casting roll than that of the polyester, there arises a problem that the immiscible thermoplastic resin is separated from the surface of the polyester sheet when the sheet is removed from the casting roll, thereby depositing on the surface of the casting roll. This results in decrease in gloss of the cast surface of the resultant film, so that the difference in gloss between the cast surface and air-side surface becomes small, thereby failing to provide a printing surface which is required to have a high gloss. Further, when the amount of the immiscible thermoplastic resin deposited on the surface of the casting roll is considerably increased, the deposited immiscible thermoplastic resin is transferred onto a cast surface of respective films subsequently produced, so that uneven patterns tend to be formed thereon, thereby causing severe damage to quality of the products when used for printing.

Furthermore, the gloss of the fine cell-containing polyester film may be increased by laminating a polyethylene terephthalate homopolymer layer containing no fine cells on the fine cell-containing polyester film. However, in this case, in order to impart a desired gloss to the film, it is necessary to increase the thickness of the homopolymer layer. Such an increased thickness of the homopolymer layer causes problems that the flexibility of the film is lost as a whole and the resultant prints are deteriorated in printing density.

As a result of the present inventors' earnest studies, it has been found that by stretching a film made of a polyester composition containing a specific thermoplastic resin in a specific amount in at least one direction, the obtained fine cell-containing polyester film is excellent in gloss, printability, transport property, heat resistance and/or surface smoothness, has an appropriate flexibility and is useful as a base film of image-receiving papers for a video printer and release papers for print seal. The present invention has been attained on the basis of the finding.

SUMMARY OF THE INVENTION

It is an object of the present invention to provide a fine cell-containing polyester film which can simultaneously satisfy contradictory requirements, i.e., is excellent in both an image-receiving ability and a transport property, and an image-receiving paper suitable for a video printer in which a base film of the image-receiving paper is composed of the fine cell-containing polyester film.

It is another object of the present invention to provide a fine cell-containing polyester film having excellent printability and transport property, and an image-receiving paper suitable for a video printer in which a base film of the image-receiving paper is composed of the fine cell-containing polyester film.

It is a further object of the present invention to provide a fine cell-containing polyester film having an excellent heat resistance, a good surface smoothness and an appropriate flexibility, which can also exhibit a good printability when used as a base film of an image-receiving paper for a video printer.

It is a still further object of the present invention to provide a fine cell-containing polyester film which can simultaneously satisfy a good adhesion property to a coating layer such as a silicone coat and a good transport property upon feeding papers, and a release paper suitable for print seal, which is composed of the fine cell-containing polyester film.

To accomplish the aim, in a first aspect of the present invention, there is provided a fine cell-containing polyester film comprising 70 to 97% by weight of polyester and 3 to 30% by weight of a thermoplastic resin immiscible with polyester and produced by stretching at least one direction, the difference in gloss between opposite higher-gloss and lower-gloss surfaces of the polyester film being not less than 3%, and the higher-gloss surface of the polyester film having a gloss of not less than 25%.

In a second aspect of the present invention, there is provided a fine cell-containing polyester film comprising 70 to 97% by weight of polyester and 3 to 30% by weight of a thermoplastic resin immiscible with polyester and produced by stretching at least one direction, the higher-gloss surface of the polyester film having a gloss $G_C$ not less than 33%, and the lower-gloss surface of said polyester film having a gloss $G_A$ of 25±7%.

In a third aspect of the present invention, there is provided a fine cell-containing polyester film comprising 70 to 97% by weight of polyester and 3 to 30% by weight of a thermoplastic resin immiscible with polyester and produced by stretching at least one direction, the higher-gloss surface whose the gloss of is not less than 25%, having a surface roughness Ra of 0.06 to 0.25 μm.

In a fourth aspect of the present invention, there is provided a fine cell-containing polyester film comprising 70 to 97% by weight of polyester and 3 to 30% by weight of a thermoplastic resin immiscible with polyester and produced by stretching at least one direction, the difference in gloss between opposite higher-gloss and lower-gloss surfaces of the polyester film being not less than 3%, the higher-gloss surface of the polyester film having a gloss of not less than 25%, and the thermoplastic resin immiscible with the polyester containing a nonionic surfactant.

In a fifth aspect of the present invention, there is provided a fine cell-containing polyester film (laminated polyester film) comprising:

a fine cell-containing polyester film A comprising 70 to 97% by weight of polyester and 3 to 30% by weight of a thermoplastic resin immiscible with polyester and a polyester layer B having a density of not less than ($\rho_A$+0.10 g/cm³) and not less than 1.10 g/cm³, having a density $\rho_A$ of 0.50 to 1.20 g/cm³, and laminated on the fine cell-containing polyester layer A, and the difference in gloss between opposite higher-gloss of the polyester layer B and lower-gloss surface of the polyester film A being not less than 3%, the higher-gloss surface of the polyester layer B having a gloss of not less than 25%, said laminated polyester film satisfying the following formulae (1) and (2) simultaneously:

$$17t + 10 \leq G \leq 10t + 90 \quad (1)$$

$$40 \leq G \leq 150 \quad (2)$$

wherein t represents a thickness (μm) of said polyester layer B; and G represents a gloss (%) of a surface of said polyester layer B.

In a sixth aspect of the present invention, there is provided a fine cell-containing polyester film (laminated polyester film) comprising:

a fine cell-containing polyester film A comprising 70 to 97% by weight of polyester and 3 to 30% by weight of a thermoplastic resin immiscible with polyester and polyester layers B (layer B1 and Layer B2) having a density of not less than ($\rho_A$+0.10 g/cm³) and not less than 1.10 g/cm³, having a density $\rho_A$ of 0.50 to 1.20 g/cm³, which have higher-gloss surcafe and lower-gloss surface, and are laminated on each surface of the fine cell-containing polyester layer A, and the difference in gloss between a higher-gloss of the polyester layer B1 and a lower-gloss surface of the polyester layer B2 being not less than 3%, the higher-gloss surface of the polyester layer B1 having a gloss of not less than 25%, said laminated polyester film satisfying the following formulae (1) and (2) simultaneously:

$$17t + 10 \leq G \leq 10t + 90 \quad (1)$$

$$40 \leq G \leq 150 \quad (2)$$

wherein t represents a thickness (μm) of said polyester layer B; and G represents a gloss (%) of a surface of the higher-gloss of the polyester layer B1.

In a seventh aspect of the present invention, there is provided an image-receiving paper for a video printer, comprising:

a fine cell-containing polyester film (laminated polyester film) comprising:

a fine cell-containing polyester film A comprising 70 to 97% by weight of polyester and 3 to 30% by weight of a thermoplastic resin immiscible with polyester and a polyester layer B having a density of not less than ($\rho_A$+0.10 g/cm³) and not less than 1.10 g/cm³, having a density $\rho_A$ of 0.50 to 1.20 g/cm³, and laminated on the fine cell-containing polyester layer A, and the difference in gloss between opposite higher-gloss of the polyester layer B and lower-gloss surface of the polyester film A being not less than 3%, the higher-gloss surface of the polyester layer B having a gloss of not less than 25%, said laminated polyester film satisfying the following formulae (1) and (2) simultaneously:

$$17t + 10 \leq G \leq 10t + 90 \quad (1)$$

$$40 \leq G \leq 150 \quad (2)$$

wherein t represents a thickness (μm) of said polyester layer B; and G represents a gloss (%) of a surface of said polyester layer B; and a photosensitive recording layer formed on the surface of said polyester layer B.

In an eighth aspect of the present invention, there is provided an image-receiving paper for a video printer, comprising:

a fine cell-containing polyester film (laminated polyester film) comprising:

a fine cell-containing polyester film A comprising 70 to 97% by weight of polyester and 3 to 30% by weight of a thermoplastic resin immiscible with polyester and polyester layers B (layer B1 and Layer B2) having a density of not less than ($\rho_A$+0.10 g/cm$^3$) and not less than 1.10 g/cm$^3$, having a density $\rho_A$ of 0.50 to 1.20 g/cm$^3$, which have higher-gloss surcafe and lower-gloss surface, and are laminated on each surface of the fine cell-containing polyester layer A, and the difference in gloss between a higher-gloss of the polyester layer B1 and a lower-gloss surface of the polyester layer B2 being not less than 3%, the higher-gloss surface of the polyester layer B1 having a gloss of not less than 25%, said laminated polyester film satisfying the following formulae (1) and (2) simultaneously:

$$17t + 10 \leq G \leq 10t + 90 \quad (1)$$

$$40 \leq G \leq 150 \quad (2)$$

wherein t represents a thickness (μm) of said polyester layer B; and G represents a gloss (%) of a surface of the higher-gloss of the polyester layer B1; and a photosensitive recording layer formed on the surface of said polyester layer B.

In a ninth aspect of the present invention, there is provided an image-receiving paper for a video printer, comprising:

a fine cell-containing polyester film comprising 70 to 97% by weight of polyester and 3 to 30% by weight of a thermoplastic resin immiscible with polyester and produced by stretching at least one direction, the difference in gloss between opposite higher-gloss and lower-gloss surfaces of the polyester film being not less than 3%, and the higher-gloss surface of the polyester film having a gloss of not less than 25%; and a photosensitive recording layer formed on the surface whose the gloss of is not less than 25%.

In a tenth aspect of the present invention, there is provided an image-receiving paper for a video printer, comprising:

a fine cell-containing polyester film comprising 70 to 97% by weight of polyester and 3 to 30% by weight of a thermoplastic resin immiscible with polyester and produced by stretching at least one direction, the difference in gloss between opposite higher-gloss and lower-gloss surfaces of the polyester film being not less than 3%, the higher-gloss surface of the polyester film having a gloss of not less than 25%, and the thermoplastic resin immiscible with the polyester containing a nonionic surfactant; and a photosensitive recording layer formed on the surface whose the gloss of is not less than 25%.

In an eleventh aspect of the present invention, there is provided a release paper for a print seal, comprising a fine cell-containing polyester film comprising 70 to 97% by weight of polyester and 3 to 30% by weight of a thermoplastic resin immiscible with polyester and produced by stretching at least one direction, the higher-gloss surface of the polyester film having a gloss $G_C$ of not less than 33%, and the lower-gloss surface of said polyester film having a gloss $G_A$ of 25±7%.

DETAILED DESCRIPTION OF THE INVENTION

The present invention is described in detail below.

Polyesters constituting the fine cell-containing polyester film according to the present invention may be those produced from, for example, an aromatic dicarboxylic acid or an ester thereof and a glycol as primary starting materials, and having repeating units comprising not less than 80% of ethylene terephthalate units or ethylene-2,6-naphthalate units. Further, the polyesters may contain the third components unless the content thereof departs from the aforementioned range.

Examples of the suitable aromatic dicarboxylic acids used for the production of the polyester may include terephthalic acid, 2,6-naphthalene dicarboxylic acid, isophthalic acid, phthalic acid, adipic acid, sebacic acid, oxycarboxylic acid such as p-oxyethoxy-benzoic acid, or the like. These aromatic dicarboxylic acids can be used singly or in the form of a mixture of any two or more thereof. Examples of the suitable glycols used for the production of the polyester may include ethylene glycol, diethylene glycol, propylene glycol, butane diol, 1,4-cyclohexane dimethanol, neopentyl glycol or the like. These glycols can be used singly or in the form of a mixture of any two or more thereof.

In the production of the fine cell-containing polyester film according to the present invention, there may be preferably used a method of stretching a polyester composition containing a thermoplastic resin immiscible with polyester, in at least one direction.

In this case, the content (An) of the polyester-immiscible thermoplastic resin is usually 3 to 30% by weight, preferably 5.0 to 25% by weight, more preferably 8.0 to 25% by weight, still more preferably 10 to 20% by weight based on the total weight of the polyester and the immiscible thermoplastic resin. When the content (An) thereof is less than 3.0% by weight, the amount of fine cells formed in the film becomes too small, so that the resultant film cannot exhibit a sufficiently reduced weight and a good cushioning property which are features of fine cell-containing polyester films. In addition, it tends to be difficult to control a gloss of opposite surfaces of the film to aimed ranges. On the other hand, when the content (An) of the immiscible thermoplastic resin is more than 30% by weight, there is a tendency that the resultant film is deteriorated in mechanical strength and thermal stability and has too large surface roughness. Also, this tends to make it difficult to control a gloss of the opposite surfaces of the film to aimed ranges. These films whose content of the immiscible thermoplastic resin is out of the above-mentioned range, are unsuitable for release papers or the like which are necessary to exhibit a good paper feeling and a high adhesion property to a coating layer such as a silicone coat. Further, in the case where the content (An) is more than 30% by weight, there arises such a productional problem that the breaking of the film is frequently caused upon stretching thereof.

Specific examples of the above-mentioned thermoplastic resins immiscible with polyester may include polyolefins such as polyethylene, polypropylene, polymethyl pentene or polymethyl butene, polystyrene, polycarbonates, polyphenyl sulfides, liquid crystal polyesters or the like. Among them, from the standpoints of the production cost or the productivity, polypropylene, polymethyl pentene and polystyrene are preferred, and polypropylene is more preferred.

The above-mentioned preferred polypropylenes are crystalline polypropylene homopolymers having usually not less than 95 mol %, preferably not less than 98 mol % of propylene units. In the case where amorphous polypropylene is used as the immiscible thermoplastic resin, the bleed-out of the polypropylene is caused on a surface of an unoriented sheet during the production of the film, so that a cooling drum, a stretching roll or the like is apt to be soiled therewith. Also, if the polypropylene is copolymerized with more than 5 mol % of other units than propylene, e.g., ethylene units, there may be a tendency that the amount of the fine cells formed in the polyester is insufficient.

The melt flow index (MFI) of the afore-mentioned polypropylene is usually in the range of 0.5 to 30 g/10 min, preferably 1.0 to 15 g/10 min. When the MFI of the polypropylene is less than 0.5 g/10 min, the size of the cells formed may become too large, so that breaking or rupture of the resultant film is likely to occur upon stretching thereof. On the other hand, when the MFI of the polypropylene is more than 30 g/10 min, the uniformity in density of the film may tend to be deteriorated with the passage of time, resulting in deteriorated productivity in the production line of the film.

Especially, in accordance with the present invention, it is preferred that the polyester-immiscible thermoplastic resin contains (e.g., by kneading therewith) a lubricant selected from the group consisting of higher alcohols having not less than 10 carbon atoms, higher fatty acids having not less than 10 carbon atoms, esters of higher fatty acids having not less than 10 carbon atoms, metal salts of higher fatty acids having not less than 10 carbon atoms, and amides of higher fatty acids having not less than 10 carbon atoms. Examples of these lubricants may include cetyl alcohol, stearyl alcohol, 12-hydroxy stearic acid, stearic acid, ethyl palmitate, n-butyl stearate, ethylene glycol monostearate, stearic acid monoglyceride, calcium ricinoleate, calcium stearate, magnesium stearate, barium stearate, cadmium stearate, neutral lead stearate, dibasic lead stearate, lithium 12-hydroxy-stearate, sodium montanate, lauramide, stearamide, oleamide, erucamide, n-oleyl palmitamide, ethylene bis-stearamide or the like.

Among these lubricants, amides of higher fatty acids having not less than 10 carbon atoms, especially amides of unsaturated higher fatty acids having not less than 10 carbon atoms, such as oleamide or erucamide are preferred because these amides can exhibit a high lubricating effect.

The content of the above-mentioned lubricant in the polyester-immiscible thermoplastic resin is usually 0.005 to 2.0% by weight, preferably 0.01 to 1.0% by weight based on the total weight of the lubricant and the polyester-immiscible thermoplastic resin. When the content of the lubricant is less than 0.005% by weight, the effect of preventing the thermoplastic resin from being separated from polyester when the film is cooled on the casting roll, may be deteriorated. On the other hand, when the content of the lubricant is more than 2.0% by weight, the effect of preventing the separation of the thermoplastic resin is already saturated and brightness of the resultant film is deteriorated, so that the quality of the resultant film may tend to be adversely affected.

In the present invention, it is, also, preferred that a nonionic surfactant be contained (e.g., incorporated by kneading) in the thermoplastic resin immiscible with polyester. The above-mentioned nonionic surfactant means a compound capable of remarkably modifying the property of an interface between different molten polymer blends, i.e., exhibiting such an effect of increasing a compatibility of polyester with the immiscible thermoplastic resin at an interface therebetween. Examples of the nonionic surfactants may include polyalkylene glycol-based surfactants, polyhydric alcohol-based surfactants, silicone-based surfactants or the like. Among them, the silicone-based surfactants are preferred. Specifically, organopolysiloxane-polyoxyalkylene copolymers, alkenylsiloxanes having polyoxyalkylene moieties as side chains or the like are more preferred because these compounds have a high surface activity.

The content of the nonionic surfactant in the thermoplastic resin immiscible with polyester is usually 0.01 to 10% by weight, preferably 0.2 to 5.0% by weight based on the total weight of the nonionic surfactant and the polyester-immiscible thermoplastic resin. When the content of the surfactant is less than 0.01% by weight, there may be a tendency that the effect of inhibiting the falling-off or separation of the thermoplastic resin from polyester on the casting roll, is reduced. On the other hand, when the content of the surfactant is more than 10% by weight, the effect of inhibiting the falling-off or separation of the thermoplastic resin from polyester is already saturated, and there may be a tendency that the resultant film undergoes deteriorated quality such as low brightness.

The gloss of the fine cell-containing polyester film according to the present invention can be expressed by a value measured by Method 3 of JIS Z 8741-1983 (60° gloss). In accordance with the present invention, it is desired that the difference in gloss between the opposite surfaces of the polyester film is not less than 3%, and the higher-gloss surface of the polyester film has a gloss of not less than 25%.

When the difference in gloss between the opposite surfaces of the polyester film is less than 3%, surface properties required for the image-receiving surface and the rear surface (which contributes to transport property of the film) cannot be satisfied. Specifically, among the opposite surfaces of the fine cell-containing polyester film having different glosses from each other, it is desired that the higher-gloss surface of the polyester film is used as an image-receiving surface. When the image-receiving surface of the polyester film has a low gloss similar to that of the rear surface thereof, the printed image on the image-receiving surface is unsatisfactory in definition or clarity. Also, when the rear surface of the polyester film has a high gloss similar to that of the image-receiving surface thereof, there arises a problem that respective polyester films are prevented from being fed each single sheet to a printer, i.e., a so-called double transport of the films is caused. Therefore, the difference in gloss between the opposite surfaces of the polyester film is preferably not less than 5%, more preferably not less than 10%.

Further, when the gloss of the higher-gloss surface of the polyester film is less than 25%, the printed image thereon is also unsatisfactory in definition or clarity. Therefore, the higher-gloss surface of the polyester film has a gloss of preferably not less than 30%, more preferably not less than 33%, still more preferably not less than 35%. The upper limit of the gloss of the higher-gloss surface of the polyester film is preferably 80% in case of the non-laminated polyester film, and the upper limit of the gloss of the higher-gloss surface of the polyester film is preferably 150%, more preferably 130% in case of the laminated polyester film.

In view of the adhesion property to a coating layer such as a silicone coat, the gloss ($G_C$) of the higher-gloss surface of the polyester film is preferably 40±7%, more preferably 40±5%. Also, the gloss ($G_A$) of the opposite surface (lower-gloss surface) of the polyester film is preferably 25±7%, more preferably 25±5, still more preferably 25±3%.

When the gloss ($G_A$) of the lower-gloss surface is less than 18%, the rear surface of the polyester film may become considerably rough, resulting in damaging a favorable touch when used as products such as seal prints.

The polyesters as a raw material of the fine cell-containing polyester film according to the present invention preferably have an intrinsic viscosity ($IV_A$) of 0.45 to 0.70 at the film-forming stage. When the intrinsic viscosity ($IV_A$) is less than 0.45, the breaking of the polyester film may tend to be caused upon the film formation, so that fine cells having uneven sizes may be formed in the film and it may become difficult to control a density of the film. On the other hand, when the intrinsic viscosity ($IV_A$) is more than 0.70, there may be tendency that the amount of fine cells formed in the film may tend to be reduced. The density of the fine cell-containing polyester film according to the present invention is usually 0.70 to 1.30 g/cm$^3$, preferably 0.80 to 1.25 g/cm$^3$, more preferably 0.90 to 1.20 g/cm$^3$. When the density of the polyester film is more than 1.30 g/cm$^3$, the resultant film may tend to be deteriorated in cushioning property which is one of features of the fine cell-containing polyester film according to the present invention. On the other hand, when the density of the polyester film is less than 0.70 g/cm$^3$, the resultant polyester film may be insufficient in mechanical strength and thermal stability, resulting in adversely affecting a quality thereof and inhibiting a continuous production thereof.

The surface roughness (Ra) of the lower-gloss surface of the fine cell-containing polyester film according to the present invention is usually not less than 0.08 μm, preferably 0.08 to 0.40 μm, more preferably 0.08 to 0.25 μm, still more preferably 0.10 to 0.20 μm. When the surface roughness (Ra) is less than 0.08 μm, there may be a tendency that paper feeling peculiar to fine cell-containing polyester films is deteriorated.

The polyester film according to the present invention may has a laminated structure comprising at least the above-mentioned fine cell-containing polyester film (hereinafter referred to merely as "layer A") and a polyester film (hereinafter referred to merely as "layer B").

Concretely, the laminated polyester film according to the present invention may be constituted by (1) a laminated structure comprising the fine cell-containing polyester film (layer A) having a lower-gloss surface and a polyester film B (layer B) having a higher-gloss surface, laminated on the fine cell-containing polyester layer A; or (2) a laminated structure comprising the fine cell-containing polyester film (layer A), a polyester film B2 (layer B2) having a lower-gloss surface (corresponding to the surface of the fine cell-containing polyester film), laminated on one surface of the fine cell-containing polyester layer A and a polyester film B1 (layer B1) having a higher-gloss surface (corresponding to the surface of the layer B), laminated on other surface of the fine cell-containing polyester layer A.

The preferred polyesters as a raw material for forming the layer B of the laminated polyester film according to the present invention, are copolyesters having a percentage of copolymerization of not more than 40 mol % and containing ethylene terephthalate units or ethylene-2,6-naphthalate as primary units.

The meaning of the above-mentioned "percentage of copolymerization" is as follows. For example, in the case where the polyester comprises as a primary unit a terephthalic acid component and an ethylene glycol component, the percentage of copolymerization of the polyester means a ratio (mole percentage) of the constituting units composed of the other combinations, e.g., a combination of isophthalic acid component and ethylene glycol component, based on the mole of the whole constituting units.

Thus, since the polyester of the layer B is constituted of not a single unit but different copolymer units, the melting point of the layer B can be reduced. As a result, when the polyester film is subjected to heat-treatment upon the film formation process, the gloss of the surface of the laminated polyester film can be effectively enhanced. The reason therefor is considered such that the copolyester is more readily softened, thereby enhancing the effect of flattening the surface of the laminated polyester film. That is, when two kinds of laminated polyester films which are identical in thickness of the layer B but different in kind of polyester of the layer B, i.e., one is composed of homopolyester and the other is composed of copolyester, are compared with each other by heat-treating these films under the same conditions, one laminated film whose layer B is composed of copolyester shows a larger gloss than that of the other laminated film whose layer B is composed of homopolyester. In addition, when copolymerized polyethylene terephthalate is used as a raw material of the layer B, there can be obtained such an advantage that the resultant laminated film can maintain a relatively high flexibility as a whole, so that it becomes possible to impart to the laminated polyester film an image-receiving property enough to provide a sufficient image density and a high definition or clarity when used as a photosensitive recording medium.

When the percentage of copolymerization of the polyester is more than 40 mol %, the melting point of the polyester is decreased, so that there may be a likelihood that the laminated polyester film can no longer withstand a heat history exerted upon the production of image-receiving papers and heat applied thereto upon printing. The percentage of copolymerization of the polyester as a raw material of the layer B is preferably 1 to 20 mol %, more preferably 3 to 10 mol %.

As the copolymerizable components other than terephthalic acid, 2,6-naphthalene dicarboxylic acid and ethylene glycol, there may be used isophthalic acid, diethylene glycol, triethylene glycol or the like because these compounds are not only relatively inexpensive but also excellent in properties.

The melting point of the polyester as a raw material of the layer B is lowered as the percentage of copolymerization thereof is increased. For example, in the case where ethylene terephthalate is a primary constituting unit, the melting point of the polyester is in the range of usually 160 to 260° C., preferably 200 to 255° C., more preferably 230 to 250° C.

The cushioning property and heat-insulating property of the layer A containing fine cells may effectively acts to impart an excellent image-receiving property to exhibit a sufficient image density and a high definition or clarity when used as a photosensitive recording medium.

In accordance with the present invention, it is preferred to simultaneously satisfy the following formulae (1) and (2) with respect to 60° gloss (G %) of (according to Method 4 of JIS Z 8741-1983) the surface of the layer B and thickness t (μm) of the layer B, respectively.

$$17t + 10 \leq G \leq 10t + 90 \tag{1}$$

$$40 \leq G \leq 150 \tag{2}$$

When the gloss (G) of the surface of the layer B is less than (17t+10) % or less than 40%, images received on the film are insufficient in image density and definition or clarity. Accordingly, the gloss (G) of the surface of the layer B is preferably not less than (17t+20) % and not less than 60%, more preferably not less than (17t+30) % and not less than 80%.

On the other hand, when the gloss (G) of the surface of the layer B is more than (10t+90) % or more than 150%, the laminated polyester film may be deteriorated in slip property, so that scratches may tend to be formed on the surface of the film. Further, the deteriorated slip property causes the film to be stuck to an ink sheet, thereby causing problems such as formation of voids in obtained images, double transport of overlapped image-receiving papers or the like. Accordingly, the gloss (G) of the surface of the layer B is more preferably not more than (10t+80) % and not more than 130%.

The thickness (t) of the layer B is usually 1 to 8 μm, preferably 2 to 6 μm. When the thickness (t) of the layer B is more than 8 μm, there is a tendency that the resultant laminated polyester film is deteriorated in flexibility as a whole. On the other hand, when the thickness (t) of the layer B is less than 1 μm, the surface of the layer B tends to exhibit an insufficient gloss.

The surface roughness (Ra) of the surface of the layer B of the laminated polyester film according to the present invention, is usually 0.03 to 0.40 lm. When the surface roughness (Ra) of the surface of the layer B is less than 0.03 μm, there may arise the same problem as observed in the case where the gloss of the surface of the layer B exceeds the upper limit, i.e., the laminated polyester film is deteriorated in slip property. On the other hand, when the surface roughness Ra of the surface of the layer B is more than 0.40 μm, there may arise the problem that images received on the film are unsatisfactory in definition or clarity. Accordingly, the surface roughness of the surface of the layer B is preferably 0.05 to 0.30 μm, more preferably 0.07 to 0.24 μm.

The density $\rho_B$ of the layer B is usually not less than $(\rho_A+0.10)$ g/cm$^3$, wherein $\rho_A$ is a density of the layer A, and not less than 1.10 g/cm$^3$, preferably not less than $(\rho_A+0.10)$ g/cm$^3$ and not less than 1.20 g/cm$^3$, more preferably not less than $(\rho_A+0.10)$ g/cm$^3$ and not less than 1.30 g/cm$^3$. When the density $\rho_B$ of the layer B does not meet the above-mentioned requirements of not less than $(\rho_A+0.10)$ g/cm$^3$ and not less than 1.10 g/cm$^3$, the gloss of the surface of the layer B may be insufficiently improved.

In addition, the intrinsic viscosity (IV) of the polyester as a raw material of the layer B of the laminated polyester film may be substantially identical to or different from that of the layer A. In order to assure a continuous production of the film, it is preferred that the IV value of the layer B is higher than that of the layer A.

It is preferred that especially when used as release papers for seal print or as image-receiving papers, the polyester film according to the present invention can exhibit not only a good brightness but also a high optical density from the standpoint of imparting a high-grade appearance to these products.

In order to impart the good brightness and the high optical density to the polyester film according to the present invention, titanium dioxide, barium sulfate or other white pigments may be added thereto. Also, in order to further enhance the brightness of the film, it may be advantageous to add a fluorescent brightening agent to the film.

Any two or more of these white pigments may be added to the polyester film. In this case, it is preferred that at least titanium dioxide or barium sulfate be contained in the film.

The content of the white pigment is preferably 0.5 to 20% by weight, more preferably 1.0 to 15% by weight based on the total weight of the raw materials of the film.

As the fluorescent brightening agents suitably used in the present invention, there may be exemplified "UBITEC" (produced by CHIBA GEIGY AG), "OB1" (produced by EASTMAN KODAK CORP.) or the like. The content of the fluorescent brightening agent is preferably 0 to 0.30% by weight based on the total weight of the raw materials of the film.

The optical density of the polyester film according to the present invention is usually not less than 0.3, preferably not less than 0.5. When the optical density is less than 0.3, there may be a tendency that the film is deteriorated in applicability to image-receiving papers or seal prints.

The brightness of the polyester film according to the present invention can be expressed by a W value measured by Method C of JIS L 1015-1981. The W value of the polyester film according to the present invention is usually not less than 70, preferably not less than 80. When the W value is less than 70, the film may be deteriorated in tint thereof, thereby failing to impart a high-grade appearance to the polyester film when used as image-receiving papers or seal prints.

Meanwhile, in accordance with the present invention, in addition to the above-mentioned white pigments and fluorescent brightening agents, other known additives such as anti-oxidizing agents, heat stabilizers, anti-static agents, dyes, pigments, surfactants or the like may be blended in polyester and/or polypropylene, if required.

The polyester film according to the present invention may be provided on opposite surfaces thereof with a silicone coat (release layer), a back coat layer (rear surface-coating layer) or the like. In this case, in order to enhance the adhesion to the respective coating layers, various primer layers may be formed on any of the opposite surfaces of the polyester film. The primer layer composed of water-soluble or water-dispersible polyester-based resins and water-soluble or water-dispersible polyurethane-based resins may be applied either during or after production of the film.

As the water-soluble or water-dispersible polyester-based resins used for the production of the primer layer, there may be used any known polyesters as described in Japanese Patent Publication (KOKOKU) No. 47-40873(1972), Japanese Patent Applications Laid-open (KOKAI) Nos. 50-83497(1975), 50-121336(1975) and 52-155640(1977) or the like.

As the dicarboxylic acid components of polyesters of the primer layers, there may be exemplified aromatic dicarboxylic acids such as terephthalic acid, isophthalic acid, 2,5-naphthalene dicarboxylic acid or ester-forming derivatives of these acids; aliphatic dicarboxylic acids such as oxybenzoic acid or ester-forming derivatives thereof; or the like.

In addition, as the glycol components of polyesters of the primer layers, there may be used aliphatic, alicyclic or aromatic diols. Examples of the diols may include ethylene glycol, 1,4-butane diol, diethylene glycol, triethylene glycol, 1,4-cyclohexane dimethanol, p-xylene diol or the like. Further, poly(oxyalkylene)glycols may be used as the glycol components of the polyesters. Examples of the poly (oxyalkylene)glycols may include polyethylene glycol, polypropylene glycol, polytetramethylene glycol or the like.

As the polyesters of the primer layers, there may be used not only saturated linear polyesters composed of the above-mentioned ester-forming components, but also polyesters composed of compounds containing three or less-valent ester-forming components or polyesters having reactive unsaturated groups.

As the water-soluble or water-dispersible polyurethane-based resins used for the production of the primer layer, there may be used any known polyurethane-based resins as described in Japanese Patent Publications (KOKOKU) Nos. 42-24194(1967), 46-7720(1971), 46-10193(1971) and 49-37839(1974), Japanese Patent Applications Laid-open (KOKAI) Nos. 50-123197(1975), 53-126058(1978) and 54-138098(1979) or the like.

The polyurethane-based resins may comprise as primary polyurethane-constituting components, polyisocyanate, polyol, chain-lengthening agent, cross-linking agent or the like.

Examples of the polyisocyanates may include tolylene diisocyanate, phenylene diisocyanate, 4,4'-diphenylmethane diisocyanate, hexamethylene diisocyanate, xylylene diisocyanate, 4,4'-dicyclohexylmethane diisocyanate, isophorone diisocyanate or the like.

Examples of the polyols may include polyethers such as polyoxyethylene glycol, polyoxypropylene glycol or polyoxytetramethylene glycol; polyesters such as polyethylene adipate, polyethylene-butylene adipate or polycaprolactone; acryl-based polyols; castor oil; or the like.

Examples of the chain-lengthening agents or cross-linking agents may include ethylene glycol, propylene glycol, butane diol, diethylene glycol, trimethylol propane, hydrazine, ethylene diamine, diethylene triamine, 4,4'-diaminodiphenyl methane, 4,4'-diaminodicyclohexyl methane, water or the like.

As the preferred polyurethane-based resins, there may be exemplified those resins having a weight-average molecular weight of 300 to 20,000 and composed of polyols, ipolyisocyanates, chain-lengthening agents having reactive hydrogen atoms and compounds containing at least one group selected from groups reactive with an isocyanate group, and anionic groups.

The anionic groups contained in the polyurethane-based resin may be in the form of lithium salts, sodium salts, potassium salts or magnesium salts of —$SO_3H$, —$OSO_3H$, —COOH or the like. Among these groups, the sulfonate groups are more preferred.

As the melamine-based cross-linking agents usable in the primer layer, there may be exemplified methoxy-methylated melamine or butoxy-methylated melamine which are alkylol-modified or alkoxylol-modified melamine-based compounds. In addition, compounds obtained by co-condensation of a part of melamine with urea or the like may also be used as the melamine-based cross-linking agents. As the epoxy-based cross-linking agents usable in the primer layer, there may be exemplified compounds containing epoxy groups which are water-soluble or have a percentage of water-solubilization of not less than 50%.

By adding the above-mentioned cross-linking agent, the primer layer can be improved in fixing property, water resistance, solvent resistance and mechanical strength. In consequence, when a top coat layer is formed on the primer layer, the adhesion therebetween can be effectively improved. Especially, the melamine-based cross-linking agents can show a high curing speed. Therefore, when the melamine-based cross-linking agent is used in combination with a curing catalyst such as proton acids or ammonium salts, the above-mentioned properties can be further enhanced. The amount of the curing (cross-linking) agent used is preferably 0.1 to 60% by weight based on the weight of a dry solid content of the primer layer.

As the method of applying a coating solution for the primer layer on the fine cell-containing polyester film, any known coating methods may be used optionally. Examples of the suitable coating methods may include a rod coating method, a roll coating method, a gravure coating method, a roll brushing method, a spray coating method, an air-knife coating method, an immersing method, a curtain coating method or the like. These coating methods may be used solely or in combination.

The primer layer may be formed on either one or both surfaces of the polyester film. It is preferred that the primer layers be formed on both surfaces of the polyester film, because it becomes possible to readily form two top coat layers, i.e., a silicone coat (release layer) on one surface of the film and a back coat layer (rear surface-coating layer) on the other surface thereof.

The primer layer may be preferably applied on the fine cell-containing polyester film before completion of its crystal orientation. The fine cell-containing polyester film before completion of its crystal orientation may include an unoriented film obtained by melt-extruding a raw material through an extrusion die on a rotary cooling drum to form a sheet, and then cooling and solidifying the sheet thereon, a uniaxially oriented film obtained by stretching the unoriented film in either longitudinal or transverse direction, a biaxially oriented film obtained by stretching the uniaxially oriented film in the direction perpendicular to the preceding stretching direction but not subjected to heat fixation for completing the crystal orientation thereof, or the like. Among them, it is preferred that the coating solution for the primer layer is applied on the uniaxially oriented film, and dried while the uniaxially oriented film introduced into a tenter is subjected to transverse stretching and heat fixation therein.

The solid concentration of the above-mentioned coating solution for the primer layer is usually not more than 30% by weight, preferably not more than 15% by weight. The amount of the coating solution applied is preferably 0.5 to 20 $g/cm^3$, more preferably 1 to 10 $g/cm^3$ (calculated as a dry solid content).

The coating solution for the primer layer may further contain, if required, various additives such as coating property-modifying agents, thickeners, lubricants, polymer particles, inorganic particles, pigments, dyes, anti-oxidants, ultraviolet-absorbing agents, infrared-absorbing agents, anti-static agents, anti-foaming agents, foaming agents or the like. Since water is used as a solvent of the coating solution, gelatin or an emulsion containing water-soluble resins such as polyvinyl alcohol, vinyl-based resins or epoxy-based resins may be further added to the coating solution, if required.

In order to impart a good slip property to the laminated polyester film according to the present invention, appropriate particles may be added to the layer B of the laminated polyester film. Especially, when no white pigments are added to the layer B, the addition of such particles are effective to impart a slip property to the laminated polyester film. Examples of the suitable particles added to the layer B may include metal oxide particles such as silica or alumina, particles made of salts such as calcium carbonate, organic particles made of cross-linked polymers, or the like. The average particle size of the particles added is usually not more than 3 $\mu$m. When the average particle size of the particles added is more than 3 $\mu$m, the layer B and an adjacent layer contacted therewith tend to be separated from each other at an interface therebetween. Further, there tend to be caused problems such as falling-off or separation of the particles from the polyester film or decrease in gloss of the film. The amount of the particles added to the layer B is usually not more than 7% by weight, preferably not more than 0.7% by weight. When the amount of the particles added is more than 7% by weight, there may tend to be caused problems such as separation of the particles from the film or decrease in gloss of the film.

Meanwhile, in accordance with the present invention, in addition to the above-mentioned white pigments, fluorescent brightening agents and lubricants, any other known additives such as anti-oxidizing agents, heat stabilizers, antistatic agents, dyes, pigments, surfactants or the like may be blended in polyester and/or polypropylene, if required.

In the production of the polyester film according to the present invention, an appropriately blended polymer composition is melt-extruded and then stretched in at least one direction by a roll-stretching method, a tentering method or the like. However, in order to facilitate formation of fine cells and adequately satisfy requirements of film strength or dimensional stability, a biaxial stretching method and a heat-treating method may be usually used in combination.

In the following, the production of the polyester film according to the present invention will be explained in detail with respect to a typical example using a biaxial stretching method.

The films produced may be in the form of a single layer film made of a single raw material or a multi-layered film (laminated film). The laminated film may basically have a three-layered structure "BAB" composed of two different raw materials, or a two-layered structure "BA" composed of two different raw materials, but may have a four or more-layered structure. First, the raw material blends for respective layers are fed to corresponding separate extruders, melt-kneaded therein and then melt-extruded through respective extrusion dies every extruder line to form molten sheets. In the case of the laminated film, the raw material for the respective layers may be usually introduced into the extrusion dies via a multi-manifold or a feed block.

Next, each molten sheet melt-extruded from the die is rapidly cooled to a temperature below a glass transition temperature thereof on a rotary cooling drum to form a substantially amorphous unoriented sheet. In this case, in order to achieve a high flatness of the sheet and improve the cooling effect, it is preferable to increase the adhesion between the sheet and the rotary cooling drum. For this purpose, an electrostatic pinning method can be suitably used.

Next, the thus-obtained unoriented sheet is biaxially stretched to form a biaxially oriented film. Fine cells in the polyester film according to the present invention can be produced by such a stretching method.

That is, the unoriented sheet is first stretched in one (longitudinal) direction at a drawing temperature of usually 70 to 150° C., preferably 75 to 130° C. and a draw ratio of usually 2.5 to 6.0 times, preferably 3.0 to 5.0 times. Such a stretching may be conducted by using a roll-type or tenter-type stretching machine. Next, the uniaxially oriented sheet is stretched in the direction perpendicular to the preceding direction (i.e., transverse direction) at a drawing temperature of usually 75 to 150° C., preferably 80 to 140° C. and a draw ratio of usually 2.5 to 6.0 times, preferably 3.0 to 5.0 times to obtain a biaxially oriented film. The second stretching may be conducted by using the tenter-type stretching machine.

The stretching in each direction can also be conducted in two or more stages. In this case, it is required that the total draw ratio of the sheet is within the above-specified ranges. Alternatively, the afore-mentioned unoriented sheet can be subjected to a simultaneous biaxial stretching such that the surface area draw ratio is 7 to 30 times.

The heat treatment of the oriented sheet may be conducted at 150 to 250° C. for 1 second to 5 minutes under the condition of an elongation or a limited shrinkage of not more than 30%, or a constant length.

Further, after completion of the biaxial stretching, the biaxially oriented film may be re-stretched in the longitudinal (machine) direction at a drawing temperature of 110 to 180° C. and a draw ratio of 1.05 to 2.0 times, and thereafter the re-oriented film may be subjected to heat treatment. In this case, various procedures such as heat fixation before the longitudinal re-stretching, longitudinal relaxation after the longitudinal re-stretching, or fine longitudinal stretching before or after the longitudinal re-stretching can be appropriately adopted. Similarly, the biaxially oriented film can be re-stretched in the transverse direction. Further, the resultant sheet may be subjected to various surface treatments during the film-forming process, if required.

The thickness of the thus-produced polyester film according to the present invention is usually 20 to 250 µm, preferably 37 to 200 µm, more preferably 40 to 200 µm.

The fine cell-containing polyester film according to the present invention may be suitably applied to image-receiving papers for a printer, mounts for seal print, labels, recording papers, posters, planographic printing plates, wrapping materials, tags or the like.

The laminated polyester film according to the present invention may be used solely or in the form of a bonded product obtained by bonding the film with any other material, and may be suitably applied to image-receiving papers for a printer such as a video printer, labels, recording papers, posters, mounts for seal print, planographic printing plates, wrapping materials, tags or the like.

The fine cell-containing polyester film according to the present invention can provide such a polyester film having a specific gloss on opposite surfaces thereof and an image-receiving paper having excellent properties. Therefore, such a fine cell-containing polyester film is extremely useful from the industrial viewpoint.

Also, the fine cell-containing polyester film according to the present invention can provide such a polyester film having excellent printability and transport property.

Further, the fine cell-containing polyester film according to the present invention can provide a polyester film capable of satisfying both the requirements of adhesion property to a coating layer such as a silicone coat and delivering property upon sheet-feeding (transport property), and can be suitably used as release papers for seal print.

Furthermore, the laminated film according to the present invention can exhibit both high gloss and flexibility simultaneously, and is suitable as an image-receiving paper for a video printer.

EXAMPLES

The present invention will now be described in more detail with reference to the following examples, but the present invention is not restricted to those examples and various modifications are possible within the scope of the invention.

Various properties described below in Examples and Comparative Examples were measured or evaluated in the following manners.

In Examples and Comparative Examples, "part(s)" represents "part(s) by weight", and as a silicone-based surfactant, "SH-193" (produced by TORAY DOW CORNING CO., LTD.) was used.

(1) Intrinsic viscosity [η] (dl/g) of polyester:

One gram of polyester from which polyester-immiscible polymer components and white pigments were removed, was dissolved in 100 ml of a mixed solvent comprising phenol and tetrachloroethane at weight ratio of 50:50. The intrinsic viscosity of the polyester solution was measured at 30° C.

(2) Melt flow index (MFI) (g/10 min):

The melt flow index of the polymer was measured at 230° C., 21.1 N according to JIS K-7210-1995. The higher MFI value indicates a lower melt viscosity of the polymer.

(3) Average particle size of white pigment:

The particle diameters of the pigment were measured by a centrifugal sedimentation-type particle size distribution measuring apparatus ("SA-CP3 Model", manufactured by SHIMAZU SEISAKUSHO CO., LTD.). The particle diameter of the pigment having a cumulative volume fraction of 50% in the equivalent spherical distribution was determined as the average particle size of the pigment.

(4) Gloss:

Using a goniogloss meter VGS-1001DP (manufactured by NIHON DENSHOKU KOGYO CO., LTD.), the gloss of the surface of the film was measured by controlling a incident angle of light thereon to the MD direction according to Method 3 (60° gloss) of JIS Z-8741-1983. The gloss measurement was conducted three times on each surface of the film. An average of the three measured gloss values was calculated and determined as a gloss of each surface of the film.

(5-1) Density (g/cm$^3$) of fine cell-containing polyester film:

A square sample having a size of 10 cm×10 cm was cut from an optional portion of the film. The weight of the sample was measured and the thicknesses thereof were measured by a micrometer at optional 9 points thereof to obtain an average thickness. The weight per unit volume of the sample was calculated from the weight and the average thickness thereof. Five samples (number of measurements: 5) were measured and the average of the measured values was calculated to obtain a film density.

(5-2) Density (g/cm$^3$) of laminated polyester film:

A square sample having a size of 10 cm×10 cm was cut from an optional portion of the film. The weight of the sample was measured and the thicknesses thereof were measured by a micrometer at optional 9 points thereof to obtain an average thickness. The weight per unit volume of the sample was calculated from the weight and the average thickness thereof and determined as a density of the laminated polyester film. Next, after thicknesses of the respective layers A and B were measured by a scanning electron microscope, only the layer A was cut off from the laminated film by a microtome to obtain a density of the layer A according to density-gradient tube method and calculate a density of the layer B simultaneously. Five samples were prepared and measured in the same manner and an average of the measured values was determined as a density of the laminated polyester film.

(6) Center line average surface roughness $R_a$:

The center line average surface roughness ($R_a$) of the film was measured by a universal surface measuring device ("SE-3E", manufactured by KOSAKA KENKYUSHO CO., LTD.). The measurement was conducted 12 times for one surface (higher-gloss surface) of each sample. The lowermost and uppermost measured values were omitted, and the remaining ten measured values were taken into consideration. The average of the remaining ten measured values was determined as an average surface roughness ($R_a$) of the sample. The measuring conditions used were as follows:

Radius of stylus: 2 μm; Load applied: 0.03 gf;
Measuring length: 2.5 mm; Cut-off value: 0.8 mm (7) Optical density:

A visual light was irradiated over the film and an optical density of the film, i.e., an intensity of light transmitted through the film was measured by a Macbeth illuminometer "TD-904 Model". The measurement was conducted five times at the different points thereof and the average of the five measured values was determined as optical density of the film. The larger value of the optical density indicates the lower light transmittance.

(8) Brightness (W value):

The brightness of the film was measured by a calorimeter 300A Model (illuminant C, visual field 2°) manufactured by NIHON DENSHOKU KOGYO CO., LTD. according to Method C of JIS L-1015-1981. The measurement was conducted five times at the different points thereof. An average of the measured values on the opposite surfaces of the film was determined as brightness of the film.

(9) Evaluation of (i) definition or clarity and (ii) density of image printed:

Using a video printer (GZ-P11W, manufactured by SHARP CORP.), images were printed on a higher-gloss surface of the film by heat transfer printing method. The thus obtained hard copy was visually observed to evaluate (i) definition or clarity and (ii) density of the images thereon. The evaluations ratings are as follows:

⊚: High quality from the standpoint of definition or clarity of the images printed ○: Slightly deteriorated in definition or clarity as compared with the above rank, but still practically usable ×: Deteriorated in definition or clarity, and practically unusable

(10) Soil of casting roll uoon the film production:

The casting roll was operated continuously for one hour under the conditions defined in Examples hereinafter. Thereafter, the deposit (soil) on the casting roll was recovered by a feather blade and weighed. The ratios of the weight of the thus recovered soil to that obtained in the preseeding Example 1 are shown in Tables.

(11) Evaluation of transport property when used in printer:

The film was cut to A4-size sheets. The 30 sheets stacked were set to a manual feed port of a printing machine IMAGIO DA355 manufactured by RICOH CORP. and subjected to printing operations to observe whether or not any double transport thereof was caused. The results were classified into the following ranks:

○: The 30 sheets were adequately fed without any double transport (good transport property)

Δ: One or two double transports were caused upon feeding the 30 sheets

×: Not less than three double transports were caused upon feeding the 30 sheets (deteriorated transport property)

(12) Evaluation of adhesion to silicone coat (on higher-gloss surface of film):

100 parts by weight of a curable silicone resin (KS-779, produced by SHIN-ETSU KAGAKU KOGYO CO., LTD.), 1 part by weight of a curing agent (CAT PL-8, produced by SHIN-ETSUKAGAKU KOGYO CO., LTD.) and 2,200 parts by weight of a mixed solvent composed of methyl ethyl ketone and toluene were mixed together to prepare a coating solution. The coating solution was applied in off-line to a higher-gloss surface of the film by a roll coating method to form thereon a cured silicone resin coating layer having a thickness of 0.1 μm. The thus obtained film was allowed to stand in a room maintained at 23° C. and 50% RH for 30 days. Thereafter, the coated surface of the film was rubbed with fingers several times to observe falling-off or separation of the cured silicone resin coating layer and evaluate the adhesion property according the following evaluation criteria:

○: No falling-off or separation of the coating layer (good adhesion property)

×: Falling-off or separation of the coating layer was caused (deteriorated adhesion property)

(13) Evaluation of touch of film:

The lower-gloss surface of the film was touched with hands. The touch of the film was evaluated according to the following ratings:

○: Smooth touch (acceptable roughness), and suitable as release papers for seal print ×: Considerably rough touch

Example 1

Crystalline polypropylene chips (13% by weight) containing 0.25% by weight of oleamide as a lubricant and having a melt flow index (MFI) of 10 g/10 min, titanium oxide (2.4% by weight) having an average particle size of 0.3 μm and the fluorescent brightening agent OB1 (0.05% by weight) were uniformly blended with polyethylene terephthalate chips (84.55% by weight) having an intrinsic viscosity of 0.69 to obtain a polyester raw material X.

The polyester raw material X was charged into an extruder and then melted at 280° C. The thus obtained melt was introduced into a T die and melt-extruded through a slit-like opening on a casting roll maintained at 22° C. so that the melt extruded was cooled to form an unoriented sheet. The unoriented sheet was roll-stretched in the machine (longitudinal) direction at a drawing temperature of 83° C. and a draw ratio of 3.2 times. Further, the uniaxially oriented sheet was introduced into a tenter-type stretching machine, stretched in the transverse direction at a drawing temperature of 115° C. and a draw ratio of 3.2 times and then heat-treated in the stretching machine at 230° C. for 5 seconds, thereby obtaining a biaxially oriented fine cell-containing film having a thickness of 50 μm.

Example 2

The same procedure as defined in Example 1 was conducted except that crystalline polypropylene chips containing 0.015% by weight of erucamide as a lubricant and having a melt flow index (MFI) of 10 g/10 min were used instead of those used in Example 1, thereby obtaining a biaxially oriented fine cell-containing film.

Example 3

The same procedure as defined in Example 1 was conducted except that crystalline polypropylene chips containing 0.25% by weight of stearamide as a lubricant and having a melt flow index (MFI) of 10 g/10 min were used instead of those used in Example 1, thereby obtaining a biaxially oriented fine cell-containing film.

The properties of the respective films obtained after one-hour continuous production in Examples 1 to 3 are shown in Table 1.

TABLE 1

| Gloss | Example 1 | Example 2 | Example 3 |
|---|---|---|---|
| Cast surface | 38.6 | 34.3 | 28.5 |
| Air-side surface | 25.6 | 25.8 | 25.0 |
| Difference between the opposite surfaces | 13.0 | 8.5 | 3.5 |
| Film density | 1.01 | 1.00 | 1.00 |
| Surface roughness Ra (μm) | 0.26 | 0.29 | 0.32 |
| Optical density | 0.51 | 0.51 | 0.53 |
| Brightness (W value) | 82.0 | 82.4 | 79.2 |
| Intrinsic viscosity (IV) of film | 0.60 | 0.62 | 0.58 |
| Definition or clarity of printed image | ⊙ | ⊙ | ○ |
| Amount of deposit (soil) on casting roll | 1.0 | 6.2 | 10 |

The process for the production of raw polyesters used in the following Examples 4 and 5 was set forth below.

<Production of polyester-based resin>

33.7 parts of dimethyl terephthalate, 20.0 parts of dimethyl isophthalate, 9.1 parts of 3-sodio-sulfo-dimethyl isophthalate, 40 parts of ethylene glycol, 10 parts of diethylene glycol and 0.047 part of calcium acetate monohydrate were mixed together, and the resultant mixture was subjected to ester exchange reaction until a stoichiometric amount of methanol was distilled off at a temperature of 200 to 230° C.

Next, 0.09 part of orthophosphoric acid and then 0.025 part of antimony trioxide were added to the reaction mixture to conduct a polymerization reaction at 280° C. under reduced pressure. The thus obtained polymer had a specific viscosity of 1.53.

<Production of polyurethane-based resin>

192 parts of sulfonate group-containing polyether ($SO_3$ content: 8.3% by weight, polyethylene oxide content: 83% by weight) obtained by sulfonating polyether of ethylene oxide extracted from allyl alcohol, with sodium metabisulfite, 1,013 parts of polytetramethylene adipate (weight-average molecular weight: 2,250) and 248 parts of polypropylene oxide-polyether (weight-average molecular weight: 550) derived from bisphenol A as a starting material, were mixed together and the resultant mixture was dehydrated at 100° C. under vacuum pressure. The dehydrated mixture was maintained at 70° C. and mixed with a mixture containing 178 parts of isophorone diisocyanate and 244 parts of hexamthylene-1,6-diisocyanate. Next, the resultant mixture was stirred at a temperature of 80 to 90° C. until the isocyanate content reached 5.6% by weight, thereby obtaining a prepolymer.

After the thus obtained prepolymer was cooled to 60° C., 56 parts of burette polyisocyanate produced from 3 moles of hexamethylene diisocyanate and 1 mole of water, and 175 parts of bis-ketimine produced from isophorone diamine and acetone, were successively added to the prepolymer.

Further, water preheated to 50° C. and dissolving 15 parts of hydrazine hydrate was added while vigorously stirring to the mixture, thereby obtaining a water dispersion of polyurethane.

<Production of coating solution for primer layer>

25 parts of the above polyester-based resin, 65 parts of the above polyurethane-based resin and 10 parts of methoxymethylated melamine were weighed and dispersed in water to prepare a water dispersion having a total solid content of 10% by weight as a coating solution for primer layer.

Example 4

Crystalline polypropylene chips (13% by weight) having a melt flow index (MFI) of 10 g/10 min, titanium oxide (2.5% by weight) having an average particle size of 0.3 μm, the fluorescent brightening agent OB1 (0.05% by weight) and a silicone-based surfactant (0.1% by weight) were uniformly blended with polyethylene terephthalate chips (84.35% by weight) having an intrinsic viscosity of 0.69 to obtain a polyester raw material X1.

The polyester raw material X1 was charged into an extruder and then melted at 280° C. The thus obtained melt was introduced into a T die and melt-extruded through a slit-like opening on a casting roll maintained at 30° C., so that the melt extruded was cooled to form an unoriented sheet. The unoriented sheet was roll-stretched in the machine (longitudinal) direction at a drawing temperature of 82° C. and a draw ratio of 3.25 times. Further, the coating solution was applied to opposite surfaces of the obtained uniaxially oriented sheet to form primer layers each having thickness of 5 μm. The coated sheet was introduced into a tenter-type stretching machine, stretched in the transverse direction at a drawing temperature of 125° C. and a draw ratio of 3.8 times and then heat-treated in the tenter-type stretching machine at 230° C. for 5 seconds to obtain a biaxially oriented fine cell-containing film having a thickness of 100 μm.

The thus-obtained film was excellent in adhesion to the silicone coat and transport property in a copying machine.

Example 5

The same procedure as defined in Example 4 was conducted except that no primer layer was formed on any of the opposite surfaces of the film, thereby obtaining a biaxially oriented fine cell-containing film.

The results of Examples 4 and 5 are shown in Table 2.

TABLE 2

| Gloss | Example 4 | Example 5 |
|---|---|---|
| Higher-gloss surface | 37.1 | 53.6 |
| Lower-gloss surface | 24.1 | 31.4 |
| Film density | 1.02 | 1.03 |
| Surface roughness Ra (μm) | 0.17 | 0.16 |
| Optical density | 0.89 | 0.88 |
| Brightness (W value) | 87.7 | 88.1 |
| Intrinsic viscosity (IV) of film | 0.61 | 0.60 |
| Transport property in printer | O | Δ |
| Adhesion to silicon coat | O | O |
| Touch of film | O | O |

Example 6

Crystalline polypropylene chips (13% by weight) containing 1.0% by weight of a silicone-based surfactant composed of polydimethylsiloxane-polyoxyalkylene copolymer (SH193, produced by TORAY DOW CORNING CO., LTD.) and having a melt flow index (MFI) of 10 g/10 min, titanium oxide (2.4% by weight) having an average particle size of 0.3 μm and the fluorescent brightening agent OB1 (0.05% by weight) were uniformly blended with polyethylene terephthalate chips (84.55% by weight) having an intrinsic viscosity of 0.69 to obtain a polyester raw material X2.

The obtained polyester raw material X2 was charged into an extruder and then melted at 280° C. The thus obtained melt was introduced into a T die and melt-extruded through a slit-like opening on a casting roll maintained at 22° C., so that the melt extruded was cooled to form an unoriented sheet. The unoriented sheet was roll-stretched in the machine (longitudinal) direction at a drawing temperature of 83° C. and a draw ratio of 3.4 times. Further, the uniaxially oriented sheet was introduced into a tenter-type stretching machine, stretched in the transverse direction at a drawing temperature of 115° C. and a draw ratio of 3.0 times and then heat-treated in the tenter-type stretching machine at 230° C. for 5 seconds to obtain a biaxially oriented fine cell-containing film having a thickness of 50 μm.

Example 7

The same procedure as defined in Example 6 was conducted except that crystalline polypropylene chips containing 0.4% by weight of the surfactant SH193 and having a melt flow index (MFI) of 10 g/10 min were used instead of those used in Example 6, thereby obtaining a biaxially oriented fine cell-containing film.

Example 8

The same procedure as defined in Example 6 was conducted except that crystalline polypropylene chips containing 0.1% by weight of the surfactant SH193 and having a melt flow index (MFI) of 10 g/10 min were used instead of those used in Example 6, thereby obtaining a biaxially oriented fine cell-containing film.

The results of Examples 6 to 8 are shown in Table 3.

TABLE 3

| Gloss | Example 6 | Example 7 | Example 8 |
|---|---|---|---|
| Cast surface | 37.4 | 32.4 | 28.4 |
| Air-side surface | 25.2 | 24.9 | 24.6 |
| Difference between opposite surfaces | 12.2 | 7.5 | 3.8 |
| Surface roughness Ra (μm) | 0.17 | 0.20 | 0.23 |
| Film Density | 1.02 | 1.01 | 1.00 |
| Intrinsic viscosity (IV) of film | 0.59 | 0.60 | 0.61 |
| Optical density (%) | 0.51 | 0.50 | 0.50 |
| Brightness (W value) | 81.0 | 81.2 | 79.4 |
| Definition or clarity of printed image | ⊙ | ⊙ | O |
| Amount of deposit (soil) on casting roll (ratio) | 1.0 | 2.0 | 3.6 |

Example 9

Crystalline polypropylene chips (15% by weight) containing 0.5% by weight of a silicone-based surfactant and having a melt flow index (MFI) of 10 g/10 min, titanium oxide (2.5% by weight) having an average particle size of 0.3 μm and the fluorescent brightening agent OB1 (0.05% by weight) were uniformly blended with polyethylene terephthalate chips (82.45% by weight) having an intrinsic viscosity of 0.66 to obtain a polyester raw material A1.

Separately, a copolymerized polyethylene terephthalate raw material B1 containing 600 ppm of silicon dioxide having an average particle size of 1.45 μm and 5 mol % of isophthalic acid component as an acid component, and having an intrinsic viscosity of 0.68 and a melting point of 246° C., was prepared.

The respective raw materials A1 and B1 were charged into separate extruders and then melted at 280° C. The thus-obtained respective molten raw materials were introduced into a common die and melt-extruded through slit-like openings on a casting roll maintained at 30° C., such that outer layers made of the raw material B1 were laminated on opposite surfaces of an inner layer made of the raw material A1. The melt extruded was cooled on the casting roll to obtain an unoriented sheet having three layers made of two different raw materials. The unoriented sheet was stretched in the machine (longitudinal) direction at a drawing temperature of 80° C. and a draw ratio of 3.4 times. Further, the uniaxially oriented sheet was introduced into a tenter-type stretching machine, stretched in the transverse direction at a drawing temperature of 115° C. and a draw ratio of 3.2 times and then heat-treated in the tenter-type stretching machine at 220° C. for 5 seconds to obtain a biaxially oriented fine cell-containing laminated film having a thickness ratio of 4 μm:42 μm:4 μm.

Example 10

The same procedure as defined in Example 9 was conducted except that the thickness ratio of the obtained film was 2 μm:46 μm:2 μm, thereby obtaining a biaxially oriented fine cell-containing laminated film.

Example 11

The same procedure as defined in Example 9 was conducted except that a copolymerized polyethylene terephthalate raw material B2 containing titanium dioxide (6.8% by weight) having an average particle size of 0.3 μm, the fluorescent brightening agent OB1 (0.05% by weight) and isophthalic acid component (18 mol %) as an acid component, and having an intrinsic viscosity of 0.68 and a melting point of 210° C. was used instead of the raw material B1, thereby obtaining a biaxially oriented fine cell-containing laminated film having a thickness ratio of 2 μm:46 μm:2 μm.

The results of Examples 9 to 11 are shown in Table 4.

TABLE 4

|  | Example 9 | Example 10 | Example 11 |
|---|---|---|---|
| Thickness t of layer B (μm) | 4.0 | 2.0 | 2.0 |
| Thickness of layer A (μm) | 42.0 | 46.0 | 46.0 |
| Gloss G (%) |  |  |  |
| Higher-gloss surface | 100 | 77 | 54 |
| Lower-gloss surface | 85 | 66 | 50 |
| Surface roughness Ra (μm) | 0.17 | 0.24 | 0.26 |

TABLE 4-continued

|  | Example 9 | Example 10 | Example 11 |
|---|---|---|---|
| Density of layer A (g/cm³) | 0.76 | 0.76 | 0.75 |
| Density of layer B (g/cm³) | 1.38 | 1.38 | 1.36 |
| Optical density | 0.56 | 0.58 | 0.59 |
| Brightness W value | 81.2 | 81.7 | 84.4 |
| Density of image printed | ◎ | ◎ | X |
| Definition or clarity of printed image | ◎ | ◎ | X |

What is claimed is:

1. A fine cell-containing polyester film comprising 70 to 97% by weight of a polyester and 3 to 30% by weight of a thermoplastic resin immiscible with polyester and produced by stretching at least one direction:
    said thermoplastic resin containing at least one lubricant selected from the group consisting of alcohols having not less than 10 carbon atoms, fatty acids having not less than 10 carbon atoms, esters of fatty acids having not less than 10 carbon atoms, metal salts of fatty acids having not less than 10 carbon atoms, and amides of fatty acids having not less than 10 carbon atoms, and
    the difference in gloss between opposite surfaces of said polyester film being not less than 3%, and a gloss of one surface of said polyester film being not less than 25%.

2. A fine cell-containing polyester film according to claim 1, wherein one surface of said polyester film has a gloss $G_C$ of not less than 33%, and the other surface of said polyester film has a gloss $G_A$ of 25±7%.

3. A fine cell-containing polyester film according to claim 1, wherein the surface whose the gloss of is not less than 25%, has a surface roughness Ra of 0.06 to 0.25 μm.

4. A fine cell-containing polyester film according to claim 1, wherein said lubricant is amides of fatty acids having not less than 10 carbon atoms.

5. A fine cell-containing polyester film according to claim 1, wherein the content of said lubricant in the thermoplastic resin is 0.005 to 2.0% by weight based on the total weight of the lubricant and thermoplastic resin.

6. A fine cell-containing polyester film according to claim 1, wherein said thermoplastic resin immiscible with polyester is polypropylene.

7. A fine cell-containing polyester film according to claim 1, wherein said polypropylene has a melt flow index of 0.5 to 30 g/10 minutes.

8. A fine cell-containing polyester film according to claim 1, which further has a density of 0.70 to 1.30 g/cm³.

9. A fine cell-containing polyester film according to claim 1, wherein the difference in gloss between said opposite surfaces of said polyester film is not less than 10%.

10. A fine cell-containing polyester film according to claim 1, wherein the surface of said polyester film has a gloss of not less than 35%.

11. A fine cell-containing polyester film according to claim 2, which further has a primer layer on both surfaces of said polyester film.

12. A fine cell-containing polyester film according to claim 10, wherein said primer layer comprises a water-soluble polyester-based resin or water-dispersible polyester-based resin.

13. A fine cell-containing polyester film according to claim 2, wherein the gloss $G_C$ of one surface thereof is 33 to 47% and the gloss $G_A$ of the other surface thereof is 20 to 30%.

14. A fine cell-containing polyester film according to claim 2, wherein the content of said thermoplastic resin is 8 to 25% by weight based on the weight of the fine cell-containing polyester film.

15. A fine cell-containing polyester film according to claim 3, wherein said thermoplastic resin immiscible with said polyester contains a nonionic surfactant.

16. A fine cell-containing polyester film according to claim 14, wherein said nonionic surfactant is a silicone-based surfactant.

17. A fine cell-containing polyester film according to claim 14, wherein the content of said nonionic surfactant in the thermoplastic resin is 0.01 to 10% by weight based on the total weight of the nonionic surfactant and the thermoplastic resin.

18. A fine cell-containing polyester film according to claim 17, wherein the content of said nonionic surfactant in the thermoplastic resin is 0.2 to 5.0% by weight based on the total weight of the nonionic surfactant and the thermoplastic resin.

19. A fine cell-containing polyester film according to claim 3, wherein said surface roughness Ra of the surface whose the gloss of is not less than 25%, is 0.08 to 0.20 μm.

20. A fine cell-containing polyester film according to claim 1, which further has a polyester layer B having a density of not less than ($\rho_A$+0.10 g/cm$^3$) and not less than 1.10 g/cm$^3$, laminated on the fine cell-containing polyester film and having a density $\rho_A$ of 0.50 to 1.20 g/cm$^3$, the difference in gloss between surfaces of said polyester layer B and fine cell-containing polyester film being not less than 3%, and a gloss of one surface of said polyester layer B being not less than 25%.

said laminated polyester film satisfying the following formulae (1) and (2) simultaneously:

$$17t + 10 \leq G \leq 10t + 90 \quad (1)$$

$$40 \leq G \leq 150 \quad (2)$$

wherein t represents a thickness (μm) of said polyester layer B; and G represents a gloss (%) of a surface of said polyester layer B.

21. A fine cell-containing polyester film according to claim 20, wherein said polyester layer B comprises a copolyester having a percentage of copolymerization of not more than 40 mol %.

22. A fine cell-containing polyester film according to claim 20, which further has a polyester layer B2 having a density of not less than ($\rho_A$+0.10 g/cm$^3$) and not less than 1.10 g/cm$^3$, laminated on the fine cell-containing polyester film and having a density $\rho_A$ of 0.50 to 1.20 g/cm$^3$, the difference in gloss between surfaces of said polyester layer B1 and polyester layer B2 being not less than 3%, and a gloss of one surface of said polyester layer B1 being not less than 25%.

said laminated polyester film satisfying the following formulae (1) and (2) simultaneously:

$$17t + 10 \leq G \leq 10t + 90 \quad (1)$$

$$40 \leq G \leq 150 \quad (2)$$

wherein t represents a thickness (μm) of said polyester layer B1; and G represents a gloss (%) of a surface of said polyester layer B1.

23. An image-receiving paper for a video printer, comprising:

the fine cell-containing polyester film as defined in claim 20 or 22; and a photosensitive recording layer formed on the surface of said polyester layer B or B1.

24. An image-receiving paper for a video printer, comprising:

the fine cell-containing polyester film as defined in claim 1; and a photosensitive recording layer formed on the surface whose the gloss of is not less than 25%.

25. An image-receiving paper for a video printer, comprising:

the fine cell-containing polyester film as defined in claim 15; and a photosensitive recording layer formed on the surface whose the gloss of is not less than 25%.

26. A release paper for a print seal, comprising the fine cell-containing polyester film as defined in claim 2.

* * * * *